United States Patent
Hsu et al.

(10) Patent No.: US 11,761,450 B2
(45) Date of Patent: Sep. 19, 2023

(54) ROTATION LOCKING SYSTEM OF MOTOR OF FAN

(71) Applicant: ANPEC ELECTRONICS CORPORATION, Hsinchu (TW)

(72) Inventors: Che-Ming Hsu, Hsinchu (TW); Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 170 days.

(21) Appl. No.: 17/539,103

(22) Filed: Nov. 30, 2021

(65) Prior Publication Data

US 2023/0049456 A1 Feb. 16, 2023

(30) Foreign Application Priority Data

Aug. 16, 2021 (TW) ................................ 110130054

(51) Int. Cl.
| | | |
|---|---|---|
| *F04B 27/06* | (2006.01) | |
| *F04D 27/00* | (2006.01) | |
| *F04D 25/06* | (2006.01) | |
| *F04D 25/08* | (2006.01) | |

(52) U.S. Cl.
CPC ........... *F04D 27/001* (2013.01); *F04D 25/06* (2013.01); *F04D 25/08* (2013.01); *F04D 27/004* (2013.01)

(58) Field of Classification Search
CPC ............... F04D 27/004; F04D 15/0066; F04B 2203/00; F04B 2203/0213; F04B 2203/0209; F04B 49/20; H02P 7/29; H02P 7/2913; H02P 2205/07
See application file for complete search history.

(56) References Cited

U.S. PATENT DOCUMENTS

| | | | | |
|---|---|---|---|---|
| 4,425,766 A | * | 1/1984 | Claypole ................. | F01P 7/048 62/133 |
| 2008/0100238 A1 | * | 5/2008 | Shaw ..................... | H02P 7/2913 318/268 |
| 2011/0115423 A1 | * | 5/2011 | Kern ....................... | H02P 6/182 318/400.35 |
| 2015/0176589 A1 | * | 6/2015 | Tsai ....................... | F04D 27/004 417/42 |
| 2019/0293076 A1 | * | 9/2019 | Lai ........................... | G06F 1/20 |

FOREIGN PATENT DOCUMENTS

| | | | |
|---|---|---|---|
| CN | 108302059 A | * | 7/2018 |
| JP | 2014236809 A | * | 12/2014 |

* cited by examiner

*Primary Examiner* — Thomas Fink
(74) *Attorney, Agent, or Firm* — Li & Cai Intellectual Property Office

(57) ABSTRACT

A rotation locking system of a motor of a fan is provided. A closed-loop control circuit outputs an initial duty cycle signal according to a current rotational speed and a target rotational speed. A driver circuit outputs a driving signal to the motor to drive the motor to rotate according to the initial duty cycle signal. A lookup table arithmetic circuit looks up, from a lookup table, two reference duty cycles correspond to two reference rotational speeds that are respectively equal to the current rotational speed and the target rotational speed. The lookup table arithmetic circuit calculates a difference between the two reference duty cycles. A speed feedback control circuit compensates the initial duty cycle signal according to the difference to output a final duty cycle signal to the driver circuit. The driver circuit drives the motor to rotate according to the final duty cycle signal.

10 Claims, 4 Drawing Sheets

ROTATION LOCKING SYSTEM OF MOTOR OF FAN

CROSS-REFERENCE TO RELATED PATENT APPLICATION

This application claims the benefit of priority to Taiwan Patent Application No. 110130054, filed on Aug. 16, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a rotation locking system of a motor of a fan.

BACKGROUND OF THE DISCLOSURE

In electronic devices such as notebook computers, fans are used to cool heat generating components such as processors. When the heat generating components are cooled down by the fan, rotational speeds of motors of the fans must be precisely controlled such that the fans can properly cool the heat generating components with efficiency.

However, when the rotational speed of the motor decreases from a high value to a low value or increases from the low value to the high value, an inertial force of the fan needs to be canceled such that the rotational speed of the fan gradually increases or decreases to reach a target rotational speed. The inertial force is difficult to be quantified. Therefore, a duty cycle of a driving signal that is outputted to the motor for driving the motor to rotate may be too low or too high. Under this condition, the duty cycle of the driving signal needs to be compensated for period of times. When the motor of the fan is driven by the driving signal and the duty cycle of the driving signal reaches a target duty cycle corresponding to the target rotational speed, the rotational speed of the motor does not reach the target rotational speed due to the inertial force of the fan. When the rotational speed of the motor decreases to reach the target rotational speed, the duty cycle of the driving signal is often lower than the target duty cycle. When the rotational speed of the motor increases to reach the target rotational speed, the duty cycle of the driving signal is often higher than the target duty cycle.

SUMMARY OF THE DISCLOSURE

In response to the above-referenced technical inadequacies, the present disclosure provides a rotation locking system of a motor of a fan. The rotation locking system of the motor of the fan includes a speed detector circuit, a closed-loop control circuit, a lookup table arithmetic circuit, a driver circuit and a speed feedback control circuit. The speed detector circuit is configured to detect a current rotational speed of the motor. The closed-loop control circuit is connected to an external speed instructing circuit. The closed-loop control circuit is configured to receive a target rotational speed from the external speed instructing circuit and receive the current rotational speed from the speed detector circuit. The closed-loop control circuit is configured to output an initial duty cycle signal according to the current rotational speed and the target rotational speed. The lookup table arithmetic circuit is connected to the speed detector circuit. The lookup table arithmetic circuit is configured to store a lookup table. The lookup table arithmetic circuit stores a plurality of reference rotational speeds and a plurality of reference duty cycles on the lookup table. The plurality of reference duty cycles respectively correspond to the plurality of reference rotational speeds. The lookup table arithmetic circuit receives the target rotational speed from the external speed instructing circuit and receives the current rotational speed from the speed detector circuit. The lookup table arithmetic circuit looks up two ones of the plurality of reference rotational speeds from the lookup table. The two ones of the plurality of reference rotational speeds are respectively equal to the current rotational speed and the target rotational speed. The lookup table arithmetic circuit looks up two ones of the plurality of reference duty cycles from the lookup table. The two ones of the plurality of reference duty cycles respectively correspond to the two ones of the plurality of reference rotational speeds. The lookup table arithmetic circuit defines that the two ones of the plurality of reference duty cycles are respectively represented by a current duty cycle and a target duty cycle. The lookup table arithmetic circuit calculates a difference between the current duty cycle and the target duty cycle. The lookup table arithmetic circuit outputs the difference as a compensation duty cycle. The driver circuit is connected to the closed-loop control circuit, the lookup table arithmetic circuit and the motor. The driver circuit, according to the initial duty cycle signal, outputs a driving signal to the motor to drive the motor to rotate such that the current rotational speed of the motor gradually approaches the target duty cycle. The speed feedback control circuit is connected to the lookup table arithmetic circuit. The speed feedback control circuit is configured to compensate the initial duty cycle signal to output a final duty cycle signal to the driver circuit according to the compensation duty cycle. When the driver circuit receives the final duty cycle signal, the driver circuit drives the motor according to the final duty cycle signal.

In certain embodiments, the rotation locking system of the motor of the fan further includes a position detector circuit. The position detector circuit is connected to the motor and the speed detector circuit. The position detector circuit is configured to detect a position of a rotor of the motor to output a position detected signal. The speed detector circuit determines the current rotational speed of the motor according to the position detected signal.

In certain embodiments, when the lookup table arithmetic circuit determines that an absolute value of the compensation duty cycle reaches a preset duty cycle difference, the speed feedback control circuit compensates a duty cycle of the initial duty cycle signal to output the final duty cycle signal according to the compensation duty cycle and the preset duty cycle difference.

In certain embodiments, the lookup table arithmetic circuit calculates a duty cycle ratio of the compensation duty cycle to the target duty cycle. The speed feedback control circuit compensates the duty cycle of the initial duty cycle signal to output the final duty cycle signal according to the duty cycle ratio.

In certain embodiments, when the lookup table arithmetic circuit determines that the duty cycle ratio reaches a preset ratio, the lookup table arithmetic circuit calculates and then outputs the compensation duty cycle, and the speed feedback control circuit compensates the duty cycle of the initial duty cycle signal according to the compensation duty cycle.

In certain embodiments, the lookup table arithmetic circuit determines the preset ratio according to data related to an inertial force of the fan.

In certain embodiments, the lookup table arithmetic circuit determines whether or not the duty cycle ratio reaches the preset ratio to generate a compensation starting signal. The compensation starting signal instructs that the initial duty cycle signal is started to be compensated when the duty cycle ratio reaches the preset ratio.

In certain embodiments, when the current rotational speed of the motor is larger than the target rotational speed, the speed feedback control circuit decreases the duty cycle of the initial duty cycle signal to output the final duty cycle signal. When the current rotational speed of the motor is smaller than the target rotational speed, the speed feedback control circuit increases the duty cycle of the initial duty cycle signal to output the final duty cycle signal.

In certain embodiments, the lookup table arithmetic circuit establishes a rotational speed curve diagram according to the current rotational speed of the motor at each of a plurality of time points and the target rotational speed.

In certain embodiments, the lookup table arithmetic circuit establishes a current duty cycle curve diagram according to the current duty cycle at each of a plurality of time points.

As described above, the present disclosure provides the rotation locking system. Before the current rotational speed of the fan reaches the target rotational speed (for example, when the ratio of the difference between the current rotational speed and the target rotational speed to the target rotational speed reaches the preset ratio), the rotation locking system compensates the initial duty cycle signal according to the difference to output the final duty cycle signal for controlling the fan to rotate. As a result, the current rotational speed of the fan can quickly reach and be stably maintained at the target rotational speed.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
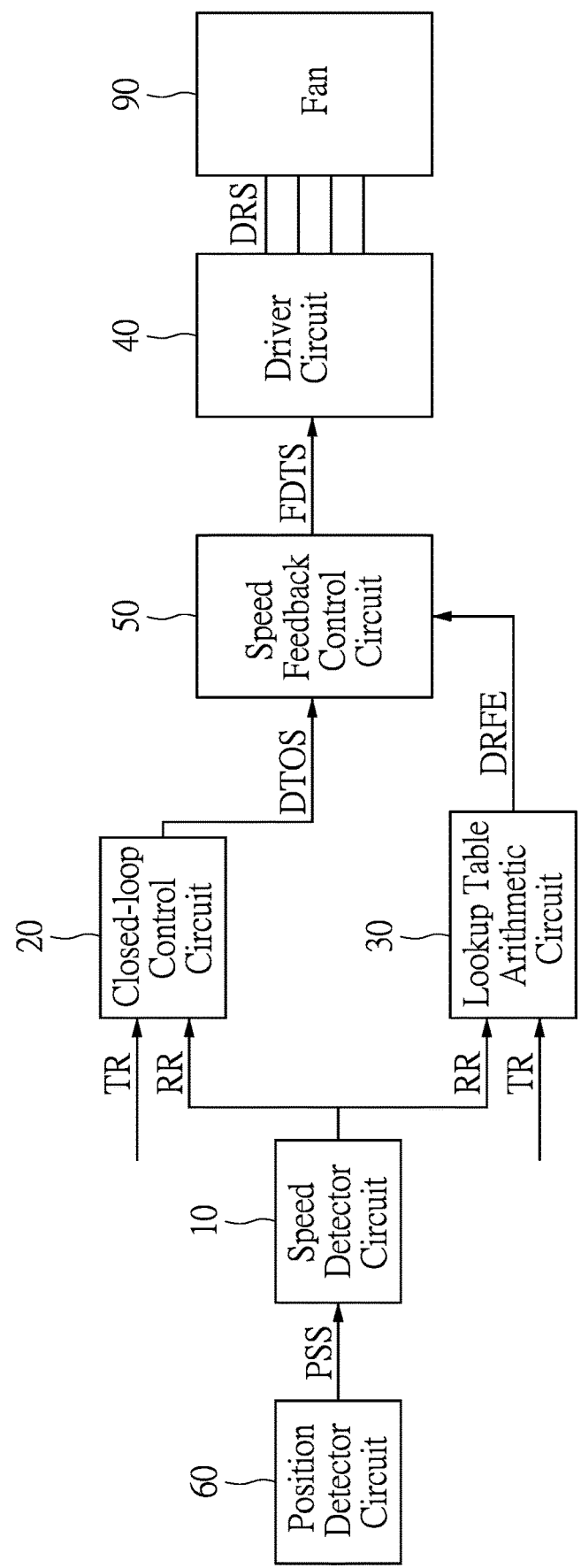
FIG. 1 is a block diagram of a rotation locking system of a motor of a fan according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIGS. 1 to 5, in which FIG. 1 is a block diagram of a rotation locking system of a motor of a fan according to an embodiment of the present disclosure, and FIGS. 2 to 5 are waveform diagrams of the rotation locking system of the motor of the fan according to the embodiment of the present disclosure.

In the embodiment, the rotation locking system may include a speed detector circuit 10, a closed-loop control circuit 20, a lookup table arithmetic circuit 30, a driver circuit 40, a speed feedback control circuit 50, and a position detector circuit 60 as shown in FIG. 1, but the present disclosure is not limited thereto. The rotation locking system is applicable to a fan 90. The fan 90 includes a motor.

The position detector circuit 60 may be connected to the motor of the fan 90 and the speed detector circuit 10. The position detector circuit 60 may detect a position of a rotor of the motor to output a position detected signal PSS to the speed detector circuit 10. For example, the position detector circuit 60 may include a Hall sensor. The speed detector circuit 10 may determine a current rotational speed RR of the motor of the fan 90 according to the position detected signal PSS.

The closed loop controller circuit 20 may be connected to an external speed instructing circuit (not shown in figures) and the speed feedback control circuit 50. The closed loop controller circuit 20 may receive a target rotational speed TR of the motor of the fan 90 from the external speed instructing circuit, and receive the current rotational speed RR of the motor of the fan 90 from the speed detector circuit 10.

The closed loop controller circuit 20 may determine a duty cycle of an initial duty cycle signal DTOS according to the current rotational speed RR and the target rotational speed TR, and output the initial duty cycle signal DTOS to the speed feedback control circuit 50.

The driver circuit 40 may be connected to the closed loop controller circuit 20 and the motor of the fan 90. The driver circuit 40 may receive the initial duty cycle signal DTOS from the closed loop controller circuit 20. The driver circuit 40 may, according to the initial duty cycle signal DTOS, output a plurality of driving signals DRS (or one driving signal) to (a plurality of transistors such as one or more high-side transistors and one or more low-side transistors of) a bridge circuit of the fan 90. The bridge circuit is connected to the motor, and is driven to control the motor to rotate by the plurality of driving signals DRS (or one driving signal). As a result, the current rotational speed RR of the motor of the fan 90 gradually increases or decreases to approach the target rotational speed TR instructed by the external speed instructing circuit.

It is worth noting that, the lookup table arithmetic circuit 30 may be connected to the speed detector circuit 10 and the speed feedback control circuit 50. The lookup table arithmetic circuit 30 may store a lookup table. The lookup table arithmetic circuit 30 may store a plurality of reference rotational speeds and a plurality of reference duty cycles on the lookup table. In an environment where the fan 90 is located, the plurality of reference duty cycles are respectively required for a rotational speed of the motor of the fan 90 to respectively reach the plurality of reference rotational speeds. That is, the plurality of reference duty cycles respectively correspond to the plurality of reference rotational speeds. The lookup table stored by the lookup table arithmetic circuit 30 may be updated according to actual requirements.

The lookup table arithmetic circuit 30 may receive the current rotational speed RR of the motor of the fan 90 from the speed detector circuit 10. The lookup table arithmetic circuit 30 may look up, from the lookup table, one of the plurality of reference rotational speeds that is equal to the current rotational speed RR of the motor of the fan 90. Then, the lookup table arithmetic circuit 30 may, from the lookup table, look up one of the plurality of reference duty cycles that corresponds to the one of the plurality of reference rotational speeds, as a current duty cycle.

In addition, the lookup table arithmetic circuit 30 may receive the target rotational speed TR from the external speed instructing circuit (not shown in figures). The lookup table arithmetic circuit 30 may look up, from the lookup table, another one of the plurality of reference rotational speeds that is equal to target rotational speed TR of the motor of the fan 90. Then, the lookup table arithmetic circuit 30 may look up, from the lookup table, another one of the plurality of reference duty cycles that corresponds to the another one of the plurality of reference rotational speeds, as a target duty cycle.

Figure 3:
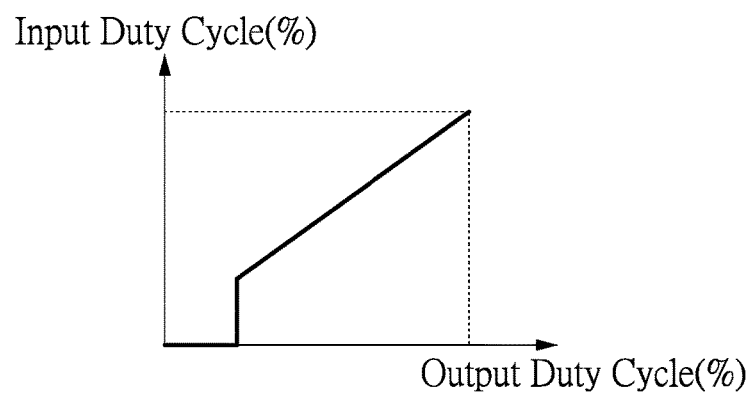
FIG. 3 is a waveform diagram of the rotation locking system of the motor of the fan according to the embodiment of the present disclosure.

The lookup table arithmetic circuit 30 may be connected to the speed feedback control circuit 50. The lookup table arithmetic circuit 30 calculates a difference between the current duty cycle and the target duty cycle as a compensation duty cycle DRFE. The lookup table arithmetic circuit 30 may output the compensation duty cycle DRFE to the speed feedback control circuit 50. For example, as shown in FIG. 3, when the current duty cycle respectively reaches different values, different compensation duty cycles respectively need to be inputted to the speed feedback control circuit 50.

The speed feedback control circuit 50 may, according to the compensation duty cycle DRFE from the look-up table arithmetic circuit 30, compensate the duty cycle of the initial duty cycle signal DTOS outputted by the closed loop controller circuit 20 to output a final duty cycle signal FDTS to the driver circuit 40.

In detail, when the current rotational speed RR of the motor of the fan 90 is larger than the target rotational speed TR, the speed feedback control circuit 50 decreases the duty cycle of the initial duty cycle signal DTOS to output the final duty cycle signal FDTS. Under this condition, a duty cycle of the final duty cycle signal FDTS is smaller than the duty cycle of the initial duty cycle signal DTOS.

Conversely, when the current rotational speed RR of the motor of the fan 90 is smaller than the target rotational speed TR, the speed feedback control circuit 50 increases the duty cycle of the initial duty cycle signal DTOS to output the final duty cycle signal FDTS. Under this condition, the duty cycle of the final duty cycle signal FDTS is larger than the duty cycle of the initial duty cycle signal DTOS.

When the driver circuit 40 receives the final duty cycle signal FDTS from the speed feedback control circuit 50, the driver circuit 40 outputs the driving signals DRS to the bridge circuit, according to the final duty cycle signal FDTS instead of the initial duty cycle signal DTOS The bridge circuit is connected to the motor of the fan 90, and is driven to control the motor of the fan 90 to rotate by the driving signals DRS.

For example, the look-up table arithmetic circuit 30 may calculate a difference between the current duty cycle and the target duty cycle as the compensation duty cycle DRFE. The look-up table arithmetic circuit 30 may determine whether or not an absolute value of the compensation duty cycle DRFE reaches a preset duty cycle difference. When the look-up table arithmetic circuit 30 determines that the absolute value of the compensation duty cycle DRFE reaches the preset duty cycle difference, the look-up table arithmetic circuit 30 determines that the initial duty cycle signal DTOS needs to be compensated. The preset duty cycle difference may depend on the target duty cycle corresponding to the target rotational speed TR. The preset duty cycle difference may be equal to the target duty cycle multiplied by 1/N. For example, 1/N may be 1/4, 1/8, 1/16 or 1/32. That is, N may be 4, 8, 16 or 32.

When the look-up table arithmetic circuit 30 determines that the initial duty cycle signal DTOS needs to be compensated, the look-up table arithmetic circuit 30 outputs (the absolute value of) the compensation duty cycle DRFE and the preset duty cycle difference to the speed feedback control circuit 50. The speed feedback control circuit 50 may, according to (the absolute value of) the compensation duty cycle DRFE and the preset duty cycle difference, compensate the duty cycle of the initial duty cycle signal DTOS to output the final duty cycle signal FDTS to the driver circuit 40.

Alternatively, the look-up table arithmetic circuit 30 may calculate a duty cycle ratio of the compensation duty cycle DRFE (that is the difference between the current duty cycle and the target duty cycle) to the target duty cycle. When the look-up table arithmetic circuit 30 determines that the duty cycle ratio reaches a preset ratio, the look-up table arithmetic circuit 30 determines that the initial duty cycle signal DTOS needs to be compensated. That is, when the look-up table arithmetic circuit 30 determines that the difference between the current duty cycle and the target duty cycle is equal to the target duty cycle multiplied by 1/N, the look-up table arithmetic circuit 30 determines that the initial duty cycle signal DTOS needs to be compensated. For example, 1/N may be 1/4, 1/8, 1/16, 1/32 or others values. That is, N may be 4, 8, 16 or 32 or others values.

When the look-up table arithmetic circuit 30 determines that the initial duty cycle signal DTOS needs to be compensated, the look-up table arithmetic circuit 30 outputs the difference between the current duty cycle and the target duty cycle as the compensation duty cycle DRFE to the speed feedback control circuit 50. The speed feedback control circuit 50 may compensate the duty cycle of the initial duty cycle signal DTOS to output the final duty cycle signal FDTS to the driver circuit 40, according to the compensation duty cycle DRFE.

The driver circuit 40 turns on or off each of the transistors (such as a first high-side transistor, a first low-side transistor, a second high-side transistor and a second low-side transistor) of the bridge circuit, according to the final duty cycle signal FDTS. As a result, the current duty cycle of the motor of the fan 90 quickly approaches the target duty cycle and is maintained at the target duty cycle such that the fan 90 stably rotates.

The lookup table arithmetic circuit 30 may determine the preset ratio according to data related to an inertial force of the fan 90 such as a weight and a size of the fan 90. For example, the smaller the weight or the size of the fan 90 is, the smaller the inertial force of the fan 90 is, the smaller a compensation time required for the initial duty cycle signal DTOS is, and the smaller the preset ratio (such as 1/N is 1/32) is. Conversely, the larger the weight or the size of the fan 90 is, the larger the inertial force of the fan 90 is, the larger the compensation time required for the initial duty cycle signal DTOS is, and the larger the preset ratio (such as 1/N is 1/4) is.

The lookup table arithmetic circuit 30 determines whether or not the duty cycle ratio of the compensation duty cycle DRFE (that is the difference between the current duty cycle and the target duty cycle) to the target duty cycle reaches the preset ratio to generate a compensation starting signal. The compensation starting signal, such as a compensation starting signal DFRS shown in FIG. 2, a compensation starting signal DFRS1 shown in FIG. 4 or a compensation starting signal DFRS2 shown in FIG. 5, may instruct a time point from which that the initial duty cycle signal is started to be compensated.

Figure 4:
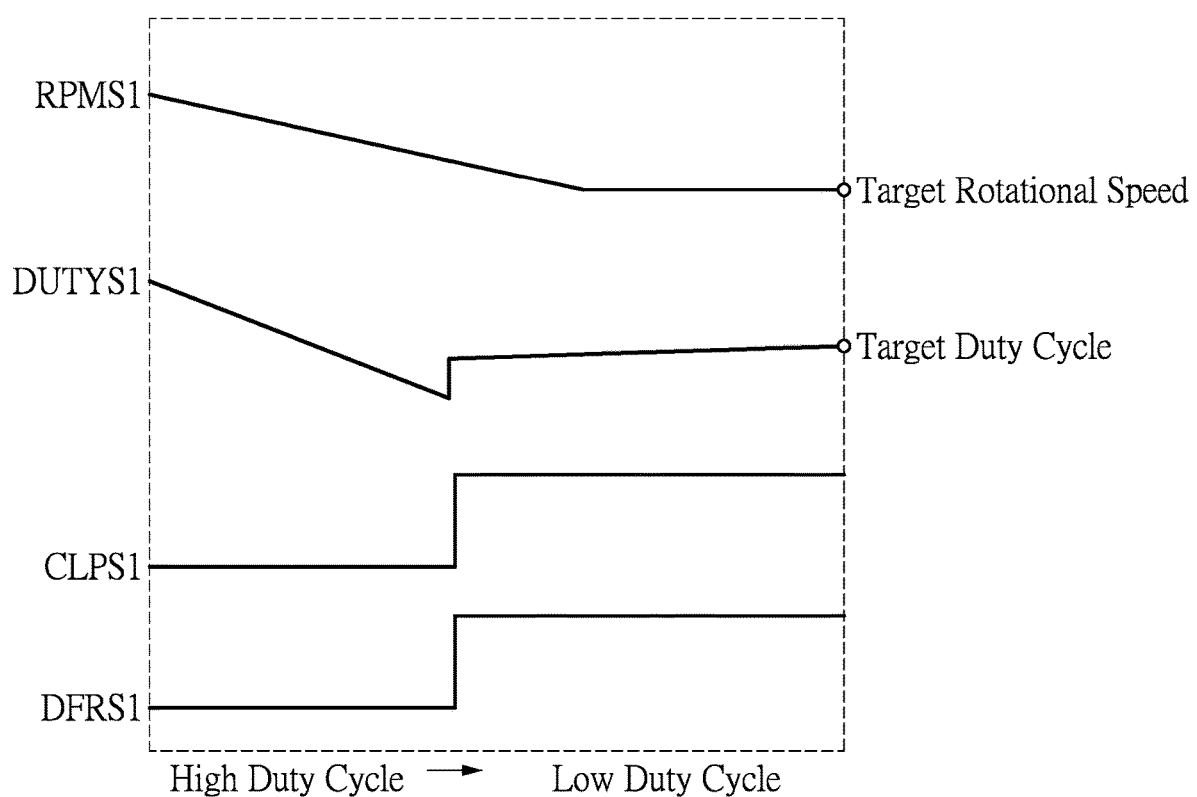
FIG. 4 is a waveform diagram of the rotation locking system of the motor of the fan according to the embodiment of the present disclosure.
Figure 5:
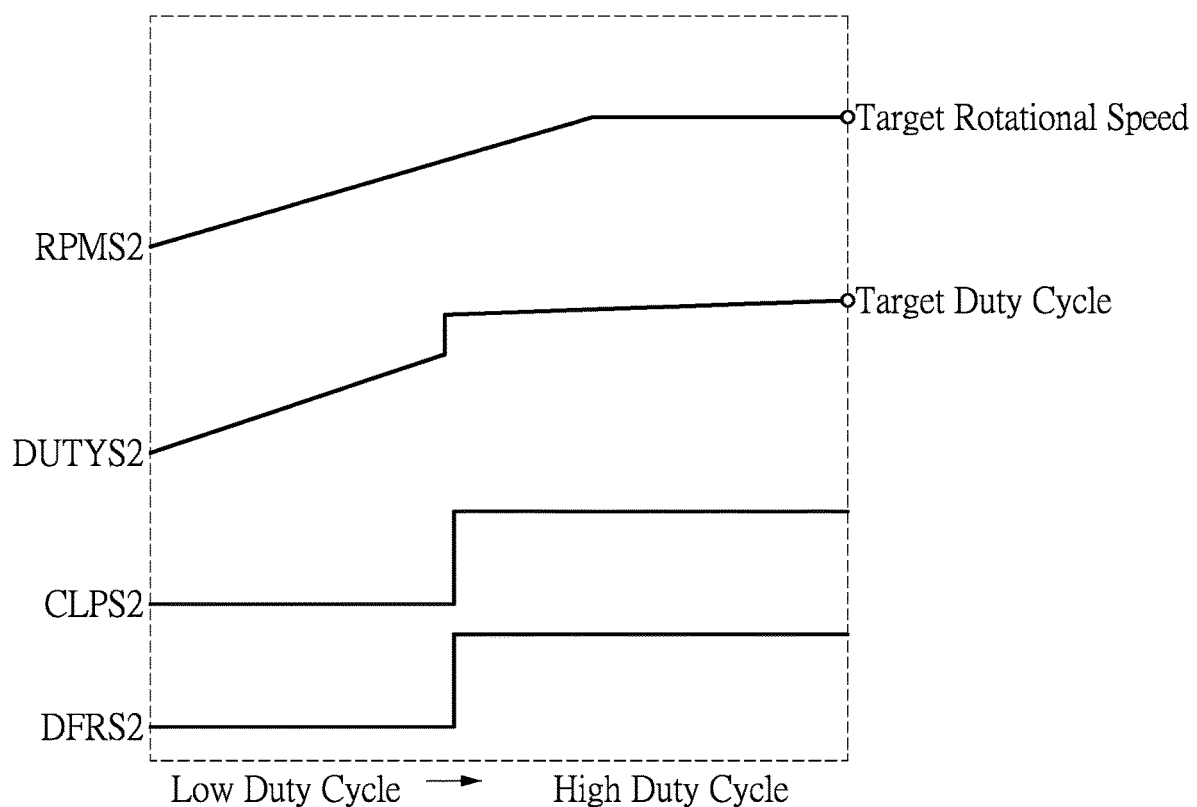
FIG. 5 is a waveform diagram of the rotation locking system of the motor of the fan according to the embodiment of the present disclosure.

The speed feedback control circuit 50 compensates the initial duty cycle signal DTOS to output the final duty cycle signal FDTS according to the compensation duty cycle DRFE such that the current rotational speed RR of the motor of the fan 90 gradually approaches the target rotational speed TR. As shown in FIG. 4, a rotational speed approaching signal CLPS1 instructs that the current rotational speed of the motor of the fan 90 gradually decreases and approaches the target rotational speed and finally reaches the target rotational speed. As shown in FIG. 5, a rotational speed approaching signal CLPS2 instructs that the current rotational speed of the motor of the fan 90 gradually increases and approaches the target rotational speed and finally reaches the target rotational speed.

Figure 2:
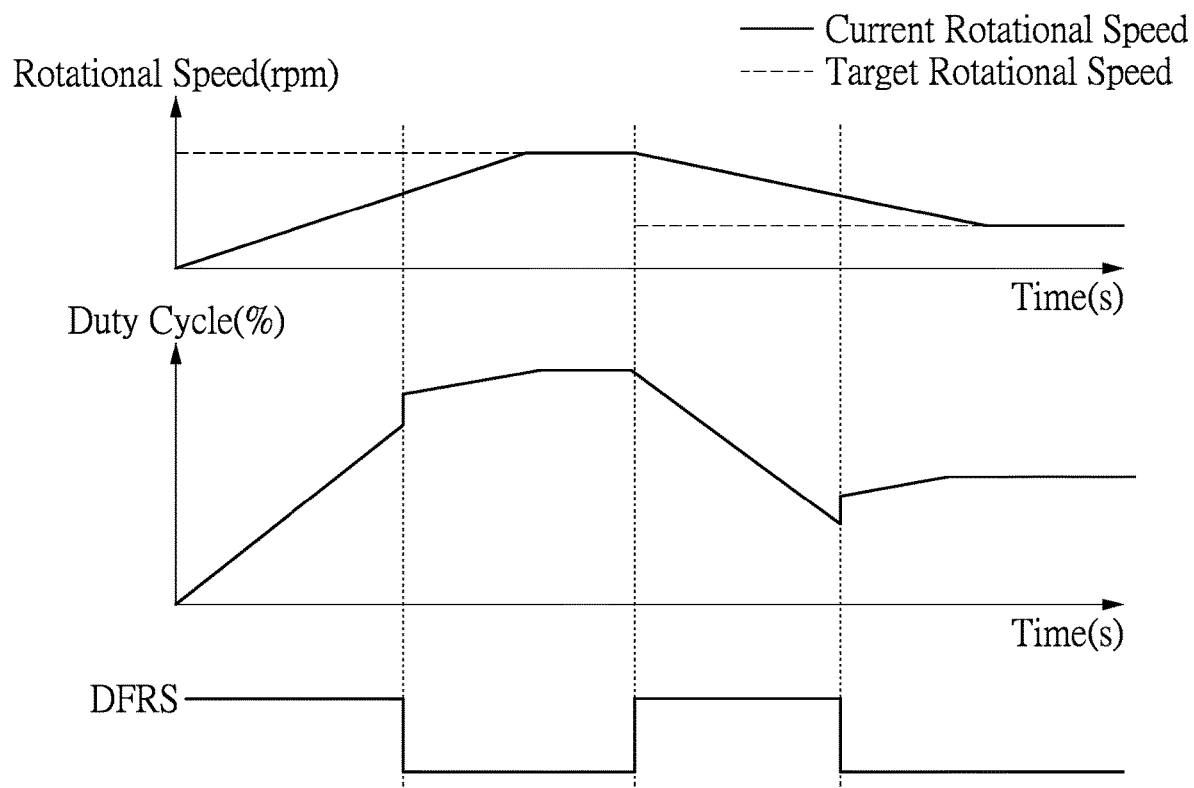
FIG. 2 is a waveform diagram of the rotation locking system of the motor of the fan according to the embodiment of the present disclosure.

The lookup table arithmetic circuit 30 may establish a rotational speed curve in a rotational speed curve diagram shown in FIG. 2 according to a plurality of current rotational speeds of the motor respectively at a plurality of time points and the target rotational speed. The lookup table arithmetic circuit 30 may establish a current duty cycle in a current duty cycle curve diagram shown in FIG. 2 according to a plurality of current duty cycles respectively at a plurality of time points.

In summary, the present disclosure provides the rotation locking system. Before the current rotational speed of the fan reaches the target rotational speed (for example, when the ratio of the difference between the current rotational speed and the target rotational speed to the target rotational speed reaches the preset ratio), the rotation locking system compensates the initial duty cycle signal according to the difference to output the final duty cycle signal for controlling the fan to rotate. As a result, the current rotational speed of the fan quickly reaches and is stably maintained at the target rotational speed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A rotation locking system of a motor of a fan, comprising:
   a speed detector circuit configured to detect a current rotational speed of the motor;
   a closed-loop control circuit connected to an external speed instructing circuit, wherein the closed-loop control circuit is configured to receive a target rotational speed from the external speed instructing circuit and receive the current rotational speed from the speed detector circuit, and the closed-loop control circuit is configured to output an initial duty cycle signal according to the current rotational speed and the target rotational speed;
   a lookup table arithmetic circuit connected to the speed detector circuit and configured to store a lookup table, wherein the lookup table arithmetic circuit stores a plurality of reference rotational speeds and a plurality of reference duty cycles on the lookup table, the plurality of reference duty cycles respectively correspond to the plurality of reference rotational speeds, the lookup table arithmetic circuit receives the target rotational speed from the external speed instructing circuit and receives the current rotational speed from the speed detector circuit, the lookup table arithmetic circuit looks up two of the plurality of reference rotational speeds from the lookup table, the two of the plurality of reference rotational speeds are respectively equal to the current rotational speed and the target rotational speed, the lookup table arithmetic circuit looks up two of the plurality of reference duty cycles from the lookup table, the two of the plurality of reference duty cycles respectively correspond to the two of the plurality of reference rotational speeds, the lookup table arithmetic circuit defines that the two of the plurality of reference duty cycles are respectively represented by a current duty cycle and a target duty cycle, the lookup table arithmetic circuit calculates a difference between the current duty cycle and the target duty cycle, and the lookup table arithmetic circuit outputs the difference as a compensation duty cycle;

a driver circuit connected to the closed-loop control circuit, the lookup table arithmetic circuit and the motor, wherein the driver circuit, according to the initial duty cycle signal, outputs a driving signal to the motor to drive the motor to rotate such that the current rotational speed of the motor gradually approaches the target duty cycle; and a speed feedback control circuit connected to the lookup table arithmetic circuit, wherein the speed feedback control circuit is configured to compensate the initial duty cycle signal to output a final duty cycle signal to the driver circuit according to the compensation duty cycle, and when the driver circuit receives the final duty cycle signal, the driver circuit drives the motor according to the final duty cycle signal.

2. The rotation locking system of the motor of the fan according to claim 1, further comprising:

a position detector circuit connected to the motor and the speed detector circuit, wherein the position detector circuit is configured to detect a position of a rotor of the motor to output a position detected signal, and the speed detector circuit determines the current rotational speed of the motor according to the position detected signal.

3. The rotation locking system of the motor of the fan according to claim 1, wherein, when the lookup table arithmetic circuit determines that an absolute value of the compensation duty cycle reaches a preset duty cycle difference, the speed feedback control circuit compensates a duty cycle of the initial duty cycle signal to output the final duty cycle signal according to the compensation duty cycle and the preset duty cycle difference.

4. The rotation locking system of the motor of the fan according to claim 1, wherein the lookup table arithmetic circuit calculates a duty cycle ratio of the compensation duty cycle to the target duty cycle, and the speed feedback control circuit compensates a duty cycle of the initial duty cycle signal to output the final duty cycle signal according to the duty cycle ratio.

5. The rotation locking system of the motor of the fan according to claim 4, wherein, when the lookup table arithmetic circuit determines that the duty cycle ratio reaches a preset ratio, the lookup table arithmetic circuit calculates and then outputs the compensation duty cycle, and the speed feedback control circuit compensates the duty cycle of the initial duty cycle signal according to the compensation duty cycle.

6. The rotation locking system of the motor of the fan according to claim 5, wherein the lookup table arithmetic circuit determines the preset ratio according to data related to an inertial force of the fan.

7. The rotation locking system of the motor of the fan according to claim 5, wherein the lookup table arithmetic circuit determines whether or not the duty cycle ratio reaches the preset ratio to generate a compensation starting signal, and the compensation starting signal instructs that compensation of the initial duty cycle signal is started when the duty cycle ratio reaches the preset ratio.

8. The rotation locking system of the motor of the fan according to claim 1, wherein, when the current rotational speed of the motor is larger than the target rotational speed, the speed feedback control circuit decreases a duty cycle of the initial duty cycle signal to output the final duty cycle signal;

wherein, when the current rotational speed of the motor is smaller than the target rotational speed, the speed feedback control circuit increases the duty cycle of the initial duty cycle signal to output the final duty cycle signal.

9. The rotation locking system of the motor of the fan according to claim 1, wherein the lookup table arithmetic circuit establishes a rotational speed curve diagram according to the current rotational speed of the motor respectively at each of a plurality of time points and the target rotational speed.

10. The rotation locking system of the motor of the fan according to claim 1, wherein the lookup table arithmetic circuit establishes a current duty cycle curve diagram according to the current duty cycle at each of a plurality of time points.

* * * * *